US011258585B2

(12) United States Patent
Barinov et al.

(10) Patent No.: US 11,258,585 B2
(45) Date of Patent: Feb. 22, 2022

(54) SYSTEMS AND METHODS FOR IMPLEMENTING ROBOTICS FRAMEWORKS

(71) Applicant: Woven Planet North America, Inc., Los Altos, CA (US)

(72) Inventors: Viktor Barinov, Sunnyvale, CA (US); Tirthkumar Nilaykumar Pandya, Foster City, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 343 days.

(21) Appl. No.: 16/363,313

(22) Filed: Mar. 25, 2019

(65) Prior Publication Data
US 2020/0313863 A1    Oct. 1, 2020

(51) Int. Cl.
*H04L 9/06* (2006.01)
*G06F 9/38* (2018.01)

(52) U.S. Cl.
CPC .......... *H04L 9/0643* (2013.01); *G06F 9/3885* (2013.01); *H04L 2209/84* (2013.01)

(58) Field of Classification Search
CPC . H04L 9/0643; H04L 2209/84; H04L 63/123; H04L 2209/805; H04L 9/3239; H04L 2209/125; G06F 9/3885; G06F 21/64; H04W 4/48
See application file for complete search history.

(56) References Cited

U.S. PATENT DOCUMENTS

| | | | | |
|---|---|---|---|---|
| 8,336,056 | B1* | 12/2012 | Gadir | G06F 9/5027 718/104 |
| 2009/0177799 | A1* | 7/2009 | Fitzek | H03M 7/4006 709/247 |
| 2012/0011108 | A1* | 1/2012 | Bensberg | G06F 16/2255 707/714 |
| 2012/0226393 | A1* | 9/2012 | Lesesky | B60R 16/0315 701/2 |
| 2012/0246163 | A1* | 9/2012 | Liu | H04L 45/38 707/737 |
| 2013/0304755 | A1* | 11/2013 | Zhou | G06F 8/36 707/758 |
| 2014/0309905 | A1* | 10/2014 | Drew | F02D 29/02 701/101 |
| 2015/0098563 | A1* | 4/2015 | Gulley | H04L 9/0643 380/28 |
| 2015/0100189 | A1* | 4/2015 | Tellis | G08G 1/096791 701/23 |
| 2015/0372896 | A1* | 12/2015 | Poole | H04L 45/021 370/412 |

(Continued)

*Primary Examiner* — Taghi T Arani
*Assistant Examiner* — Blake I Narramore
(74) *Attorney, Agent, or Firm* — Christopher G. Darrow; Darrow Mustafa PC

(57) ABSTRACT

Systems, methods, and non-transitory computer-readable media can receive a message transmitted over a robotics framework implemented on a vehicle. A determination can be made that the message satisfies criteria for multi-threaded hashing. The message can be divided into two or more message segments. A hash can be independently computed for each message segment of the two or more message segments to generate two or more message segment hashes. A message hash can be determined for the message based on the two or more message segment hashes.

16 Claims, 8 Drawing Sheets

(56) References Cited

U.S. PATENT DOCUMENTS

| | | | |
|---|---|---|---|
| 2016/0292276 A1* | 10/2016 | Denninghoff | G06F 3/04842 |
| 2017/0109420 A1* | 4/2017 | Allbright | G06F 16/1858 |
| 2018/0219810 A1* | 8/2018 | Santos Ramirez | H04L 51/14 |
| 2020/0067836 A1* | 2/2020 | Tilli | H04L 47/821 |
| 2020/0081868 A1* | 3/2020 | Lin | G06F 16/1752 |

* cited by examiner

SYSTEMS AND METHODS FOR IMPLEMENTING ROBOTICS FRAMEWORKS

FIELD OF THE INVENTION

The present technology relates to robotics frameworks. More particularly, various embodiments of the present technology relate to systems, apparatus, and methods for implementing robotics frameworks that may be utilized in autonomous, semi-autonomous, or manually driven vehicles.

BACKGROUND

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings so that it may safely navigate to target destinations or assist a human driver, if one is present, with doing the same. As one example, the vehicle may have a computing system (e.g., one or more central processing units, graphical processing units, memory, storage, etc.) for controlling various operations of the vehicle, such as driving and navigating. To that end, the computing system may process data from one or more sensors. For example, a vehicle may have sensors that can recognize hazards, roads, lane markings, traffic signals, and the like. Data from sensors may be used to, for example, safely drive the vehicle, activate certain safety features (e.g., automatic braking), and generate alerts about potential hazards.

SUMMARY

Various embodiments of the present technology can include systems, methods, and non-transitory computer readable media configured to receive a message transmitted over a robotics framework implemented on a vehicle. A determination can be made that the message satisfies criteria for multi-threaded hashing. The message can be divided into two or more message segments. A hash can be independently computed for each message segment of the two or more message segments to generate two or more message segment hashes. A message hash can be determined for the message based on the two or more message segment hashes.

In an embodiment, the criteria for multi-threaded hashing comprises a message size threshold.

In an embodiment, a number of threads to be utilized for multi-threaded hashing of the message can be determined.

In an embodiment, the number of threads to be utilized is determined based on how many CPU cores are available for multi-threaded hashing of the message.

In an embodiment, the number of threads to be utilized is determined further based on a message size of the message and a minimum message segment size threshold.

In an embodiment, the number of threads to be utilized is determined by maximizing the number of threads while satisfying the minimum message segment size threshold.

In an embodiment, the number of message segments in the two or more message segments is equal to the number of threads.

In an embodiment, each message segment of the two or more message segments is assigned to a respective CPU core of a plurality of CPU cores and hashes are computed for the two or more message segments in parallel.

In an embodiment, each message segment hash is computed using a rolling hash algorithm.

In an embodiment, each message segment hash is computed using a polynomial hash algorithm.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

Figure 1:
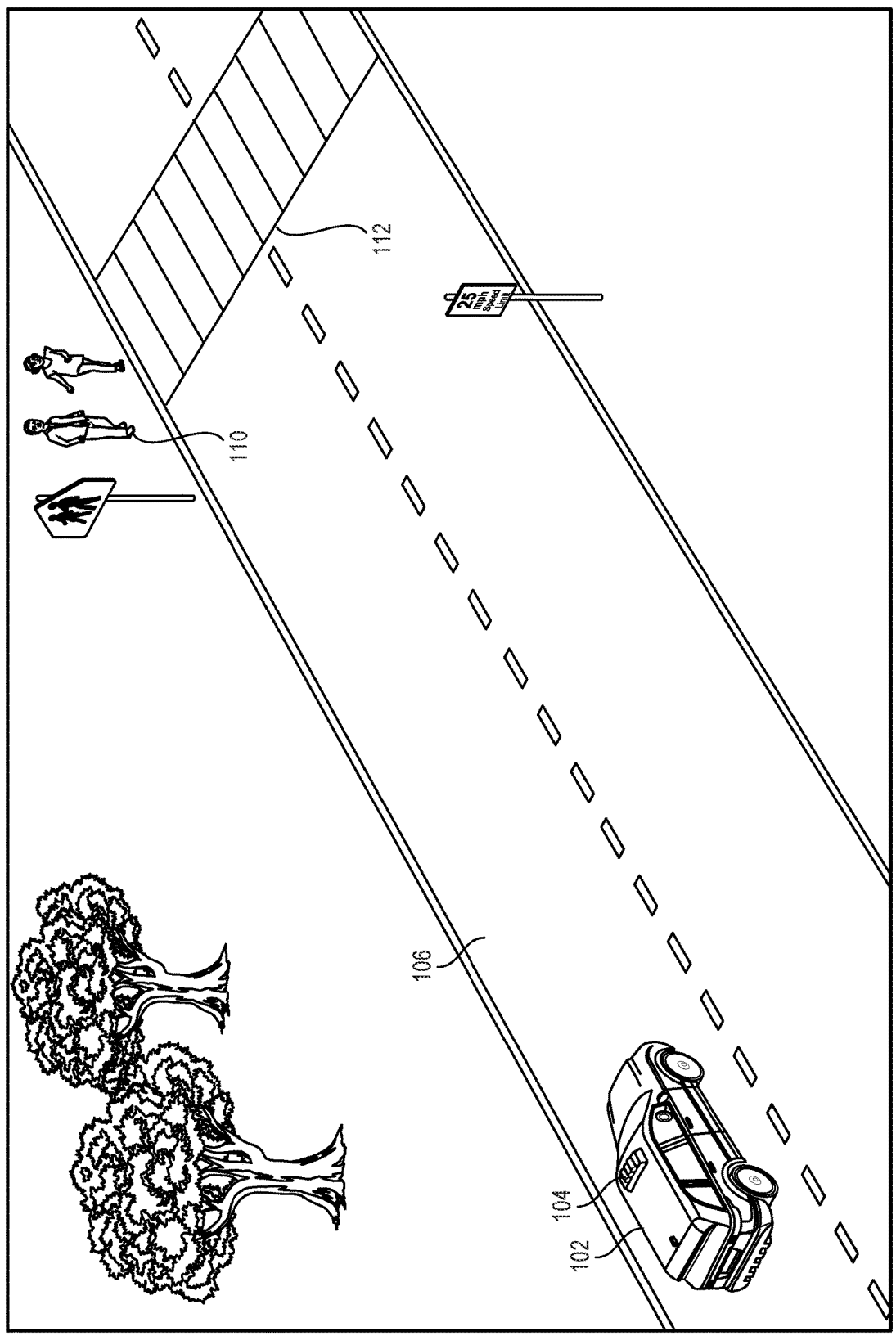
FIG. 1 illustrates an example scenario demonstrating various challenges that may be experienced when utilizing conventional approaches.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input. The vehicle may include a variety of systems and subsystems for enabling the vehicle to determine its surroundings so that it may safely navigate to target destinations or assist a human driver, if one is present, with doing the same. As one example, the vehicle may have a computing system for controlling various operations of the vehicle, such as driving and navigating. To that end, the computing system may process data from one or more sensors. For example, a vehicle may have one or more sensors or sensor systems that can recognize hazards, roads, lane markings, traffic signals, etc. Data from sensors may be used to, for example, safely drive the vehicle, activate certain safety features (e.g., automatic braking), and generate alerts about potential hazards.

Figure 2:
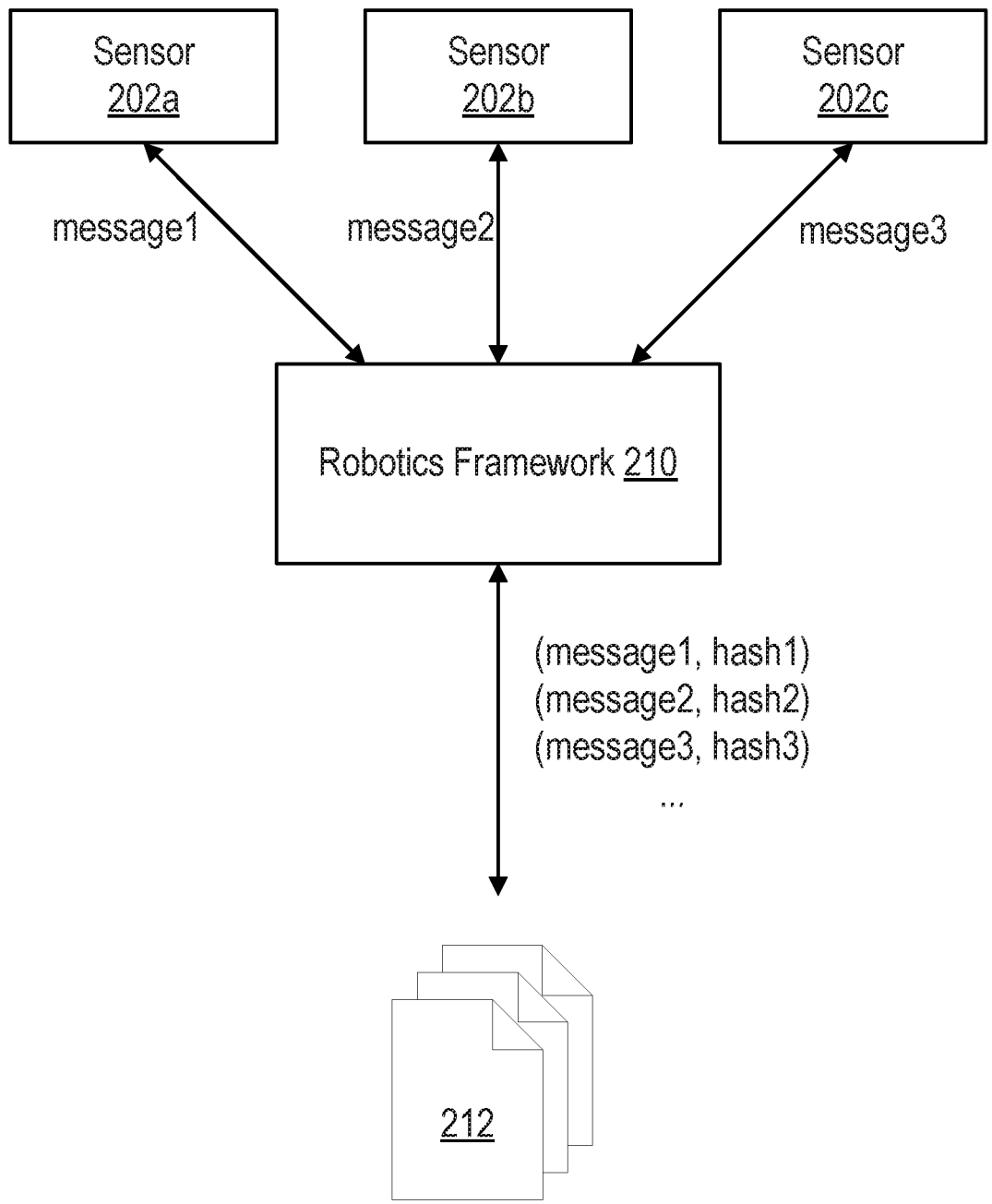
FIG. 2 illustrates various challenges that may be experienced when utilizing conventional approaches.

In general, a vehicle can utilize a robotics framework to receive data from various sensors and to make various determinations or take certain actions based on the data from the various sensors. Examples of existing robotics frameworks include the Robot Operating System (ROS) framework, other robotics frameworks that are built as extensions of ROS, and the Apollo robotics framework. However, conventional robotics frameworks pose disadvantages. FIGS. 1 and 2 illustrate example scenarios that are illustrative of various challenges that may be experienced using conventional approaches. In FIG. 1, a vehicle 102 includes a sensor suite 104 and is driving down a road 106. The vehicle 102 may be an autonomous, semi-autonomous, or manually-driven vehicle. As the vehicle 102 drives down the road 106, one or more sensors in the sensor suite 104 may receive data. A robotics framework implemented on the vehicle 102 may be configured to receive data from the one or more sensors. Furthermore, various services (or processes) implemented on the robotics framework may be configured to make various determinations or take certain actions based on the data. For example, the one or more sensors may include a camera. Image data from the camera may be provided to a first service implemented on a robotics framework in order to identify objects around the vehicle 102 based on the image data. For example, in the example scenario shown in FIG. 1, the first service may analyze image data to recognize a crosswalk 112 and pedestrians 110. Information from the first service may then be provided to a second service implemented on the robotics framework that is configured to cause the vehicle 102 to take certain actions based on the identified objects. For example, the second service can cause the vehicle 102 to come to a stop based on the identification of the crosswalk 112 and the pedestrians 110.

FIG. 2 provides a functional block diagram representation of a conventional vehicle system that illustrates communications between various components in a vehicle. In the conventional implementation depicted in FIG. 2, one or more hardware sensors 202*a-c* may transmit and/or receive communications over a robotics framework 210. As discussed above, the robotics framework 210 may include one or more services (or processes) for receiving messages from various components in a vehicle, determining appropriate actions to take based on those messages, and causing other components in the vehicle to take those actions. Numerous messages may be transmitted between components in a vehicle over the robotics framework 210. For example, in FIG. 2, each sensor 202*a-c* is transmitting a message (message1, message2, message3, respectively). The robotics framework 210 can be configured to maintain a log of each message transmitted over the robotics framework 210 (e.g., all data transmitted over the robotics framework 210). This may be done, for example, to create a record of actions taken by the robotics framework 210 and underlying data that resulted in those actions. Messages transmitted over the robotics framework 210 can be stored in one or more data logs 212 (e.g., data files, log files).

In order to ensure the reliability of data stored in the one or more data logs 212, a hash can be calculated for each message and stored along with the message. The hashes can be used to ensure that no messages have been corrupted or compromised and/or to determine which messages have been corrupted or compromised. However, under conventional approaches, generating such hashes can be problematic for a variety of reasons. One problem arises from the fact that conventional hashing algorithms generally require more time to generate hashes for messages that are larger in size. Components on a vehicle, such as one or more sensors on a vehicle, may transmit messages that are substantially large. For example, a camera on a vehicle may capture images that are tens or hundreds of megabytes in size, and may capture multiple images a second, while an imaging radar on a vehicle may output data at a rate of greater than 2 Gbps. As sensor technology improves, sensor resolution may continue to improve, which would mean larger file sizes and larger messages to be hashed. Under conventional approaches, this can be problematic, as message hashes must be computed in substantially real-time as messages are transmitted over the robotics framework and stored in data logs. If message hashes cannot be calculated sufficiently quickly, data may not be accurately stored in the data logs 212 and/or a queue of messages requiring hashing may grow very large very quickly, which may cause the robotics framework 210 to crash. This reality may lead to an undesirable scenario in which vehicle systems must limit the resolution and types of sensors being used in order to account for the speed at which the robotics framework 210 can generate message hashes. Conventional approaches fail to address these problems, among others.

An improved approach in accordance with the present technology overcomes the foregoing and other disadvantages associated with conventional approaches. In relation to the present technology, a robotics framework can implement adaptive multi-threaded hashing of messages. In various embodiments, when a message is received (e.g., a message that has been transmitted over a robotics framework), a determination can be made as to whether the message qualifies for multi-threaded hashing based on hashing criteria. If the message does not qualify for multi-threaded hashing, the message can be hashed in a single thread, and the message and hash can be stored in a data log. However, if the message does qualify for multi-threaded hashing, the message can be divided into a plurality of message segments. Each message segment can be hashed separately and independently such that a plurality of message segment hashes are calculated, one for each message segment. In an embodiment, hashing of message segments may be performed in parallel across multiple CPU cores. In an embodiment, a rolling hash algorithm can be used such that the plurality of message segment hashes can be aggregated to generate a final message hash for the original message. By splitting up the original message into smaller message segments, and performing hashing on the smaller message segments simultaneously, a hash for the original message can be generated more quickly than if the original message was hashed on its own. More details relating to the present technology are provided below.

Figure 3:
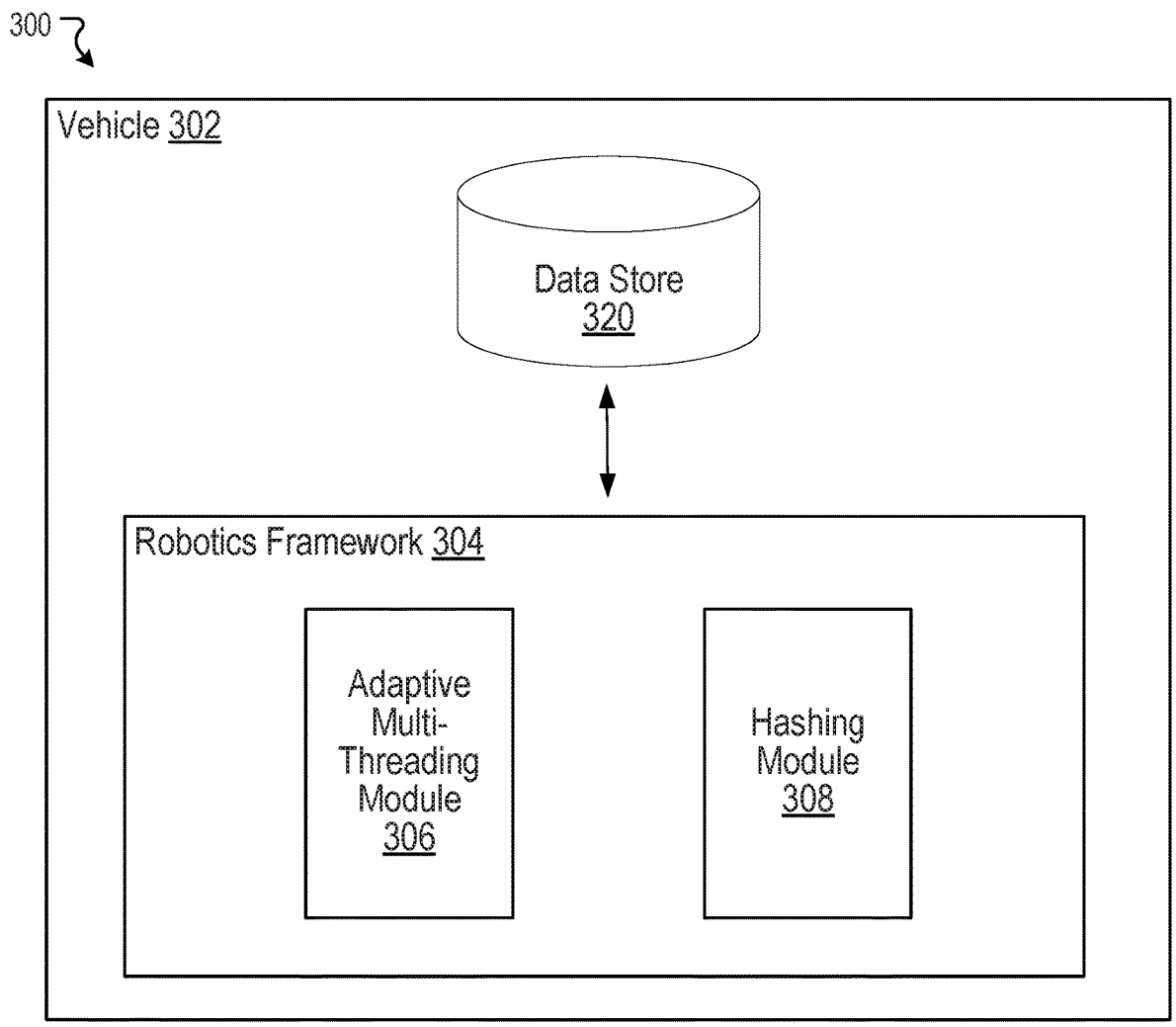
FIG. 3 illustrates an example vehicle system, according to an embodiment of the present technology.
Figure 3:
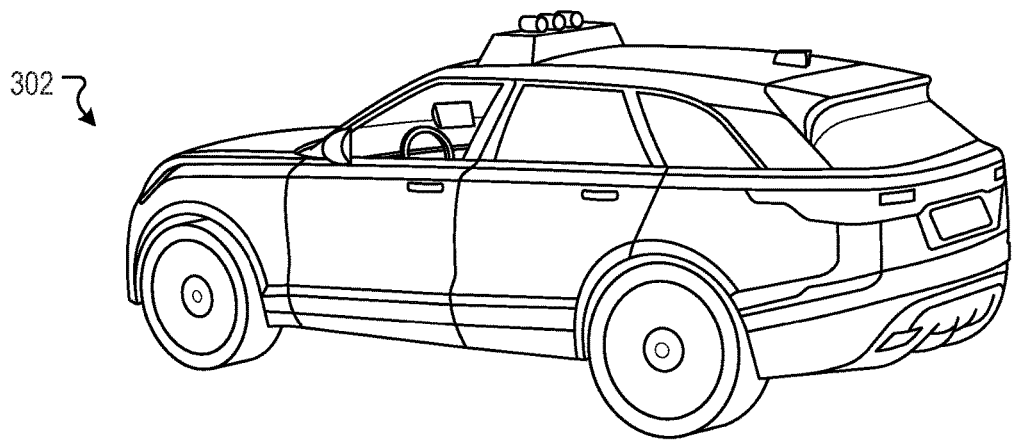

FIG. 3 illustrates an example environment 300, according to an embodiment of the present technology. The environment 300 can include an example vehicle 302. The vehicle 302 can include a robotics framework 304 and a data store 320. The vehicle 302 may be one vehicle of a fleet of vehicles, and may be managed by a transportation management system. The vehicle 302 can be, for example, a vehicle 640 of FIG. 6. As shown, the robotics framework 304 can include an adaptive multi-threading module 306 and a hashing module 308. In some embodiments, some or all of the functionality performed by the robotics framework 304 and its sub-modules may be performed by one or more computing systems implemented in a vehicle, such as the vehicle 640 of FIG. 6. The components (e.g., modules, elements, etc.) shown in this figure and all figures herein are exemplary only, and other implementations may include additional, fewer, integrated, or different components. Some components may not be shown so as not to obscure relevant details.

The robotics framework module 304 can be configured to communicate and operate with at least one data store 320, as shown in the example environment 300. The at least one data store 320 can be configured to store and maintain various types of data, such as a data log of messages transmitted over the robotics framework 304 and hashes computed for those messages. In some embodiments, some or all data stored in the data store 320 can be stored by the transportation management system 660 of FIG. 6. In some embodiments, some or all data stored in the data store 320 can be stored by the vehicle 640 of FIG. 6. More details about information that can be stored in the data store 320 are provided below.

The adaptive multi-threading module 306 can be configured to receive a message that has been transmitted over the robotics framework 304. The message may be received, for example, to be logged in a data log which logs some or all messages transmitted over the robotics framework 304. The data log may be maintained in persistent storage. In an embodiment, when a message is received, the adaptive multi-threading module 306 can determine whether the message qualifies for multi-threaded hashing based on hashing criteria. In an embodiment, the hashing criteria can include a message size threshold such that messages that exceed a threshold size qualify for multi-threaded hashing, while messages that do not exceed the threshold size do not qualify for multi-threaded hashing. Smaller messages may be hashed quickly even if they are left intact, i.e., are not divided into multiple message segments, and separation into multiple segments may actually result in slower hashing for sufficiently small messages. As such, the message size threshold may be implemented so that smaller messages are not unnecessarily and counter-productively broken up into message segments and hashed across multiple threads/cores. For example, if a message is only 50 KB in size, it would likely take longer to divide the message into five message segments of 10 KB each, hash each message segment independently, and then aggregate the message segment hashes than it would to simply hash the original 50 KB message. However, if a message is 1000 MB in size, it would likely be faster to divide the message into five message segments of 200 MB each, hash each message segment independently, and then aggregate the message segment hashes, than it would to hash the entire 1000 MB message. In an embodiment, the message size threshold may be experimentally derived. For example, the message size threshold may be 1 MB, 10 MB, 25 MB, 50 MB, or any other appropriate value.

If a message is determined to qualify for multi-threaded hashing, the adaptive multi-threading module 306 can be configured to determine how many threads to utilize for multi-threaded hashing of the message based on various criteria and considerations. In an embodiment, the number of threads to be utilized for multi-threaded hashing of a message may be determined based on a number of CPU cores available for hashing. As discussed above, the present technology allows for time savings in hashing large messages by hashing smaller message segments simultaneously in parallel across parallel threads. In order to perform parallel hashing, each thread can be assigned to a separate CPU core. As such, the number of threads may be limited by the number of CPU cores available in a computing system (e.g., in a vehicle computing system). Furthermore, the number of CPU cores available for hashing may be further constrained by other practical constraints. For example, even if a vehicle computing system has 72 CPU cores, it may not be desirable to utilize all 72 CPU cores for hashing of messages, since other processes (possibly more critical processes) in the vehicle may also require computing resources. As such, a constraint may be implemented which limits the number of CPU cores that can be allocated to message hashing. For example, if a vehicle computing system has 72 CPU cores, a constraint may be implemented which states that a maximum of 8 CPU cores can be used for message hashing. In certain embodiments, the constraint on the number of CPU cores available for message hashing may be adjustable and/or dynamically determined. For example, if a vehicle computing system is experiencing a scenario which requires high utilization of computing resources (e.g., greater than a threshold level of computing resources), the number of CPU cores that can be committed to message hashing may be decreased (e.g., from 8 cores to 4 cores), whereas if the vehicle computing system is experience a scenario which requires low utilization of computing resources (e.g., below a threshold level), the number of CPU cores that can be committed to message hashing may be increased (e.g., from 8 cores to 12 cores). Many variations are possible.

In an embodiment, the number of threads to be utilized for multi-threaded hashing of a message may be determined based on the size of the message and/or based on a minimum message segment size threshold. As discussed above, a message size threshold can be implemented to ensure that a message is only hashed using multiple threads if the message is sufficiently large that multi-threaded hashing would represent an improvement over hashing of the message as a single thread. Similarly, dividing a message into more segments than necessary may also be undesirable if each message segment is too small. For example, if 8 CPU cores are available for hashing a message, it may be worthwhile to divide an 800 MB message into eight segments such that each 100 MB message segment is hashed independently. However, if 8 CPU cores are available, and a message is only 1 MB, it may be more efficient to divide the message into two 500 KB message segments, rather than dividing the message into eight 12.5 KB message segments. As such a message segment size threshold can be implemented. In an embodiment, the message segment size threshold may be experimentally derived. For example, the message segment size threshold may be 250 KB, 500 KB, 1 MB, 2 MB, 5 MB, or any other appropriate value. In an embodiment, when a message is divided into a plurality of message segments, the message may be divided such that each message segment is substantially the same size. In an embodiment, the adaptive multi-threading module 306 may maximize the number of threads while still satisfying the minimum message segment size threshold. As discussed above, the maximum number of threads may also be constrained by the number of CPU cores available (e.g., if only 8 CPU cores are available, the number of threads may not exceed 8). For example, consider an example scenario in which the minimum message segment size threshold is 25 MB, and there are 8 CPU cores available for message hashing. A 100 MB message can be divided into four message segments while satisfying the minimum message segment size threshold (i.e., four segments of 25 MB each). As such, the adaptive multi-threading module 306 can determine that the 100 MB message should be hashed across four threads. A 50 MB message can only be divided into two message segments while satisfying the minimum message segment size threshold. Conversely, any message over 200 MB can utilize all 8 CPU cores while still satisfying the minimum message segment size threshold and, as such, any message over 200 MB can be divided into 8 message segments. Once the adaptive multi-threading module 306 has determined the number of threads, the adaptive multi-threading module 306 can divide the message into a plurality of message segments based on the number of threads (e.g., such that the number of message segments is equal to the number of threads).

The hashing module 308 can be configured to perform hashing of messages and/or message segments. As discussed above, if a message does not satisfy a message size threshold, the hashing module 308 can generate a message hash for the message by hashing the entire message in a single thread. Conversely, if a message satisfies the message size threshold, the message can be divided into a plurality of message segments. The hashing module 308 can generate message segment hashes for each message segment independently (e.g., without reliance on any of the other message segments). As discussed above, message segment hashes may be computed in parallel. The plurality of message segment hashes can be aggregated to determine a message hash for the original message. In an embodiment, the hashing module 308 can utilize a rolling hash algorithm so that message segment hashes can be combined to determine the message hash for the original message. In a more particular embodiment, the hashing module 308 can utilize a polynomial hash algorithm, which is a type of rolling hash algorithm.

Figure 4A:
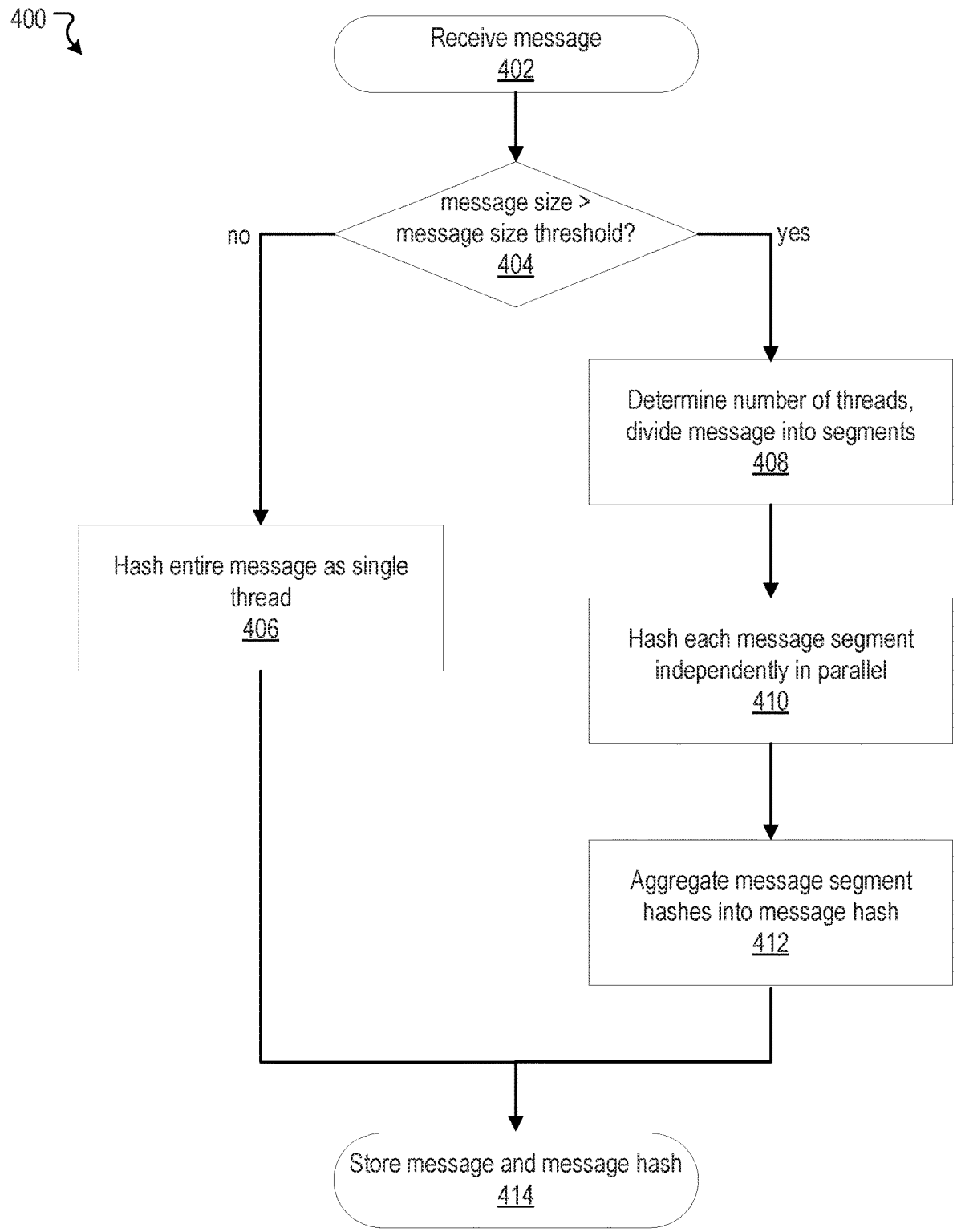
FIG. 4A illustrates an example flowchart depicting adaptive multi-threaded message hashing, according to an embodiment of the present technology.

FIG. 4A illustrates an example flow diagram 400, according to an embodiment of the present technology. At block 402, a message is received. At block 404, a determination is made as to whether the message satisfies a message size threshold. If the message does not satisfy the message size threshold, the entire message is hashed in a single thread (block 406). The message and the message hash are stored in a data log (block 414). If the message does satisfy a message size threshold, a determination is made as to the number of threads to be used to hash the message (block 408). As discussed above, the number of threads may be determined based on the number of CPU cores available, the size of the message, and a minimum message segment size threshold. The message can be divided into a plurality of message segments based on the number of threads to be utilized. In an embodiment, the number of message segments is equal to the number of threads, and each message segment has substantially the same size. At block 410, each message segment is hashed independently and in parallel to generate a plurality of message segment hashes. At block 412, the plurality of message segment hashes are aggregated to generate a message hash for the original message. At block 414, the message hash and the message are stored in a data log.

Figure 4B:
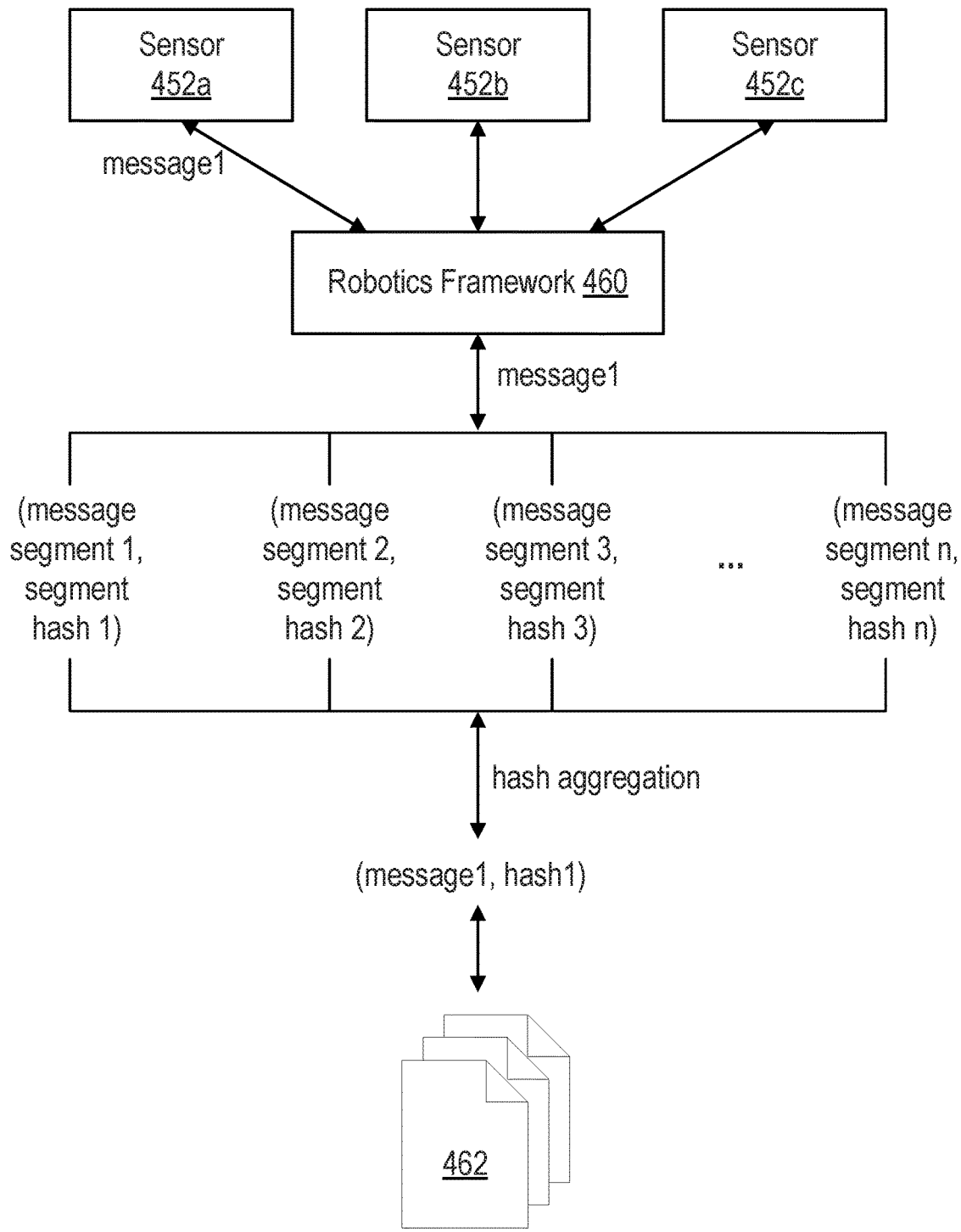
FIG. 4B illustrates a functional block diagram depicting multi-threaded message hashing, according to an embodiment of the present technology.

FIG. 4B illustrates an example functional block diagram depicting adaptive multi-threaded message hashing, according to an embodiment of the present technology. In FIG. 4B, similar to what was shown in FIG. 2, there are three sensors 452a-c communicating over a robotics framework 460. While FIG. 2 and FIG. 4B each show three sensors communicating over a robotics framework, it should be understood that additional components, including components that are not sensors, may also communicate over a robotics framework. In FIG. 4B, a first sensor 452a transmits a message, message1, over the robotics framework 460. The message is divided into a plurality of message segments (message segments 1-n). A hash is calculated for each message segment individually (segment hashes 1-n). Calculation of segment hashes may be performed in parallel across multiple CPU cores. Segment hashes 1-n are then aggregated into a single hash (hash1) for the original message (message1). Message1 and hash1 are then stored into a data log 462.

Figure 5:
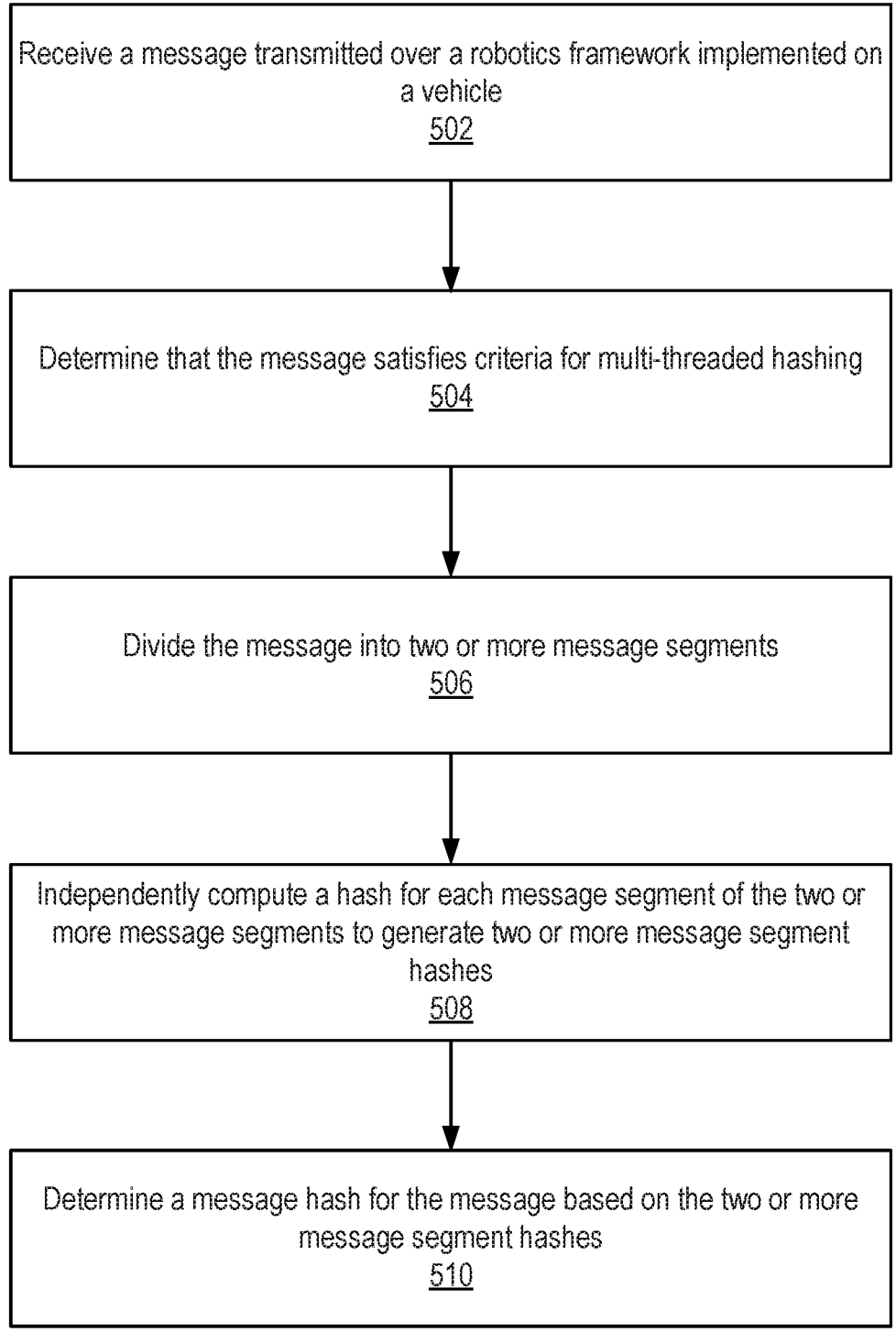
FIG. 5 illustrates an example method, according to an embodiment of the present technology.

FIG. 5 illustrates an example method 500, according to an embodiment of the present technology. At block 502, the example method 500 can receive a message transmitted over a robotics framework implemented on a vehicle. At block 504, the example method 500 can determine that the message satisfies criteria for multi-threaded hashing. At block 506, the example method 500 can divide the message into two or more message segments. At block 508, the example method 500 can independently compute a hash for each message segment of the two or more message segments to generate two or more message segment hashes. At block 510, the example method 500 can determine a message hash for the message based on the two or more message segment hashes.

Many variations to the example method are possible. It should be appreciated that there can be additional, fewer, or alternative steps performed in similar or alternative orders, or in parallel, within the scope of the various embodiments discussed herein unless otherwise stated.

Figure 6:
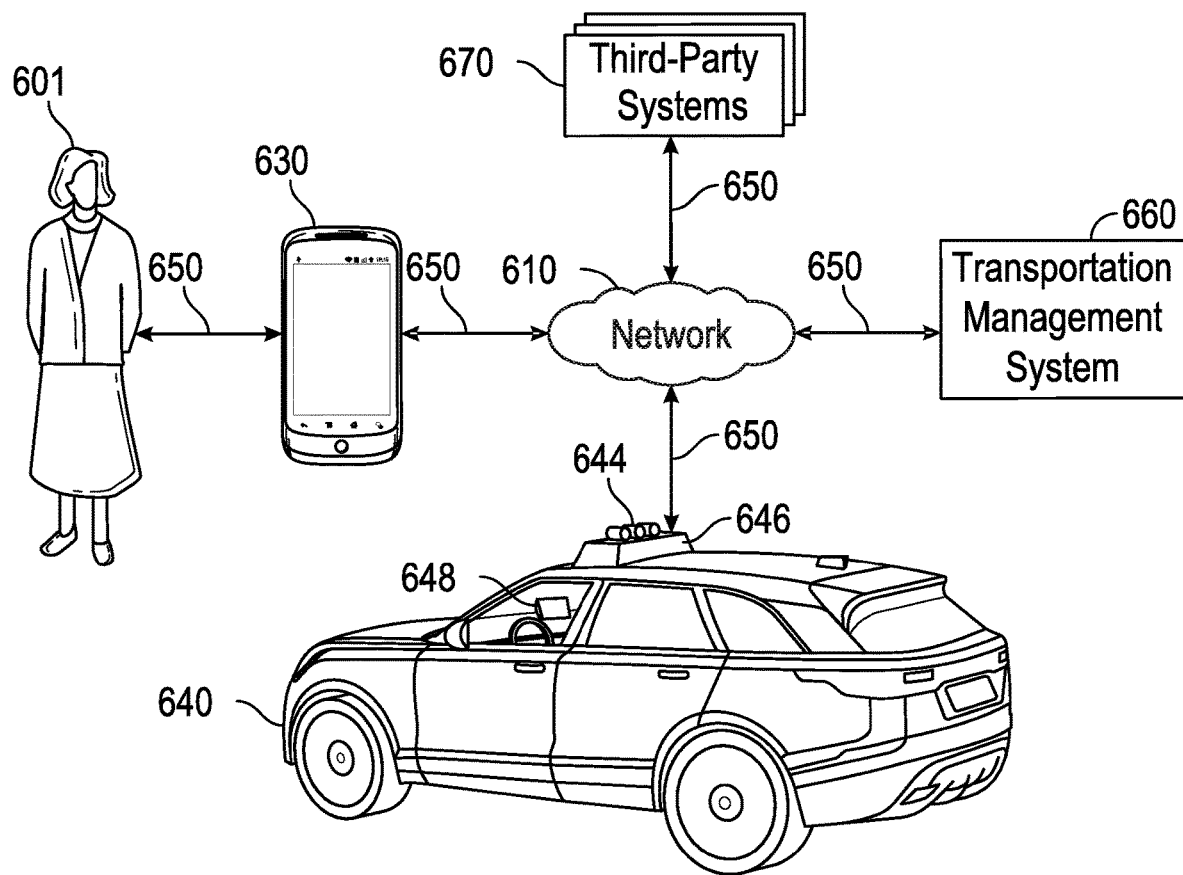
FIG. 6 illustrates an example block diagram of a transportation management environment, according to an embodiment of the present technology.

FIG. 6 illustrates an example block diagram of a transportation management environment for matching ride requestors with vehicles. In particular embodiments, the environment may include various computing entities, such as a user computing device 630 of a user 601 (e.g., a ride provider or requestor), a transportation management system 660, a vehicle 640, and one or more third-party systems 670. The vehicle 640 can be autonomous, semi-autonomous, or manually drivable. The computing entities may be communicatively connected over any suitable network 610. As an example and not by way of limitation, one or more portions of network 610 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 6 illustrates a single user device 630, a single transportation management system 660, a single vehicle 640, a plurality of third-party systems 670, and a single network 610, this disclosure contemplates any suitable number of each of these entities. As an example and not by way of limitation, the network environment may include multiple users 601, user devices 630, transportation management systems 660, vehicles 640, third-party systems 670, and networks 610. In some embodiments, some or all modules of the robotics framework 304 may be implemented by one or more computing systems of the transportation management system 660. In some embodiments, some or all modules of the robotics framework 304 may be implemented by one or more computing systems in the vehicle 640.

The user device 630, transportation management system 660, vehicle 640, and third-party system 670 may be communicatively connected or co-located with each other in whole or in part. These computing entities may communicate via different transmission technologies and network types. For example, the user device 630 and the vehicle 640 may communicate with each other via a cable or short-range wireless communication (e.g., Bluetooth, NFC, WI-FI, etc.), and together they may be connected to the Internet via a cellular network that is accessible to either one of the devices (e.g., the user device 630 may be a smartphone with LTE connection). The transportation management system 660 and third-party system 670, on the other hand, may be connected to the Internet via their respective LAN/WLAN networks and Internet Service Providers (ISP). FIG. 6 illustrates transmission links 650 that connect user device 630, vehicle 640, transportation management system 660, and third-party system 670 to communication network 610. This disclosure contemplates any suitable transmission links 650, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 650 may connect to one or more networks 610, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 650. For example, the user device 630 may communicate with the transportation management system 660 via a cellular network and the Internet, but communicate with the vehicle 640 via Bluetooth or a physical wire connection.

In particular embodiments, the transportation management system 660 may fulfill ride requests for one or more users 601 by dispatching suitable vehicles. The transportation management system 660 may receive any number of ride requests from any number of ride requestors 601. In particular embodiments, a ride request from a ride requestor 601 may include an identifier that identifies the ride requestor in the system 660. The transportation management system 660 may use the identifier to access and store the ride requestor's 601 information, in accordance with the requestor's 601 privacy settings. The ride requestor's 601 information may be stored in one or more data stores (e.g., a relational database system) associated with and accessible to the transportation management system 660. In particular embodiments, ride requestor information may include profile information about a particular ride requestor 601. In particular embodiments, the ride requestor 601 may be associated with one or more categories or types, through which the ride requestor 601 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 660 may classify a user 601 based on known information about the user 601 (e.g., using machine-learning classifiers), and use the classification to retrieve relevant aggregate information associated with that class. For example, the system 660 may classify a user 601 as a young adult and retrieve relevant aggregate information associated with young adults, such as the type of music generally preferred by young adults.

Transportation management system 660 may also store and access ride information. Ride information may include locations related to the ride, traffic data, route options, optimal pick-up or drop-off locations for the ride, or any other suitable information associated with a ride. As an example and not by way of limitation, when the transportation management system 660 receives a request to travel from San Francisco International Airport (SFO) to Palo Alto, Calif., the system 660 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 660. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 660. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 660 in particular embodiments may predict and provide ride suggestions in response to a ride request. In particular embodiments, the system 660 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 660 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 660 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 630 (which may belong to a ride requestor or provider), a transportation management system 660, vehicle system 640, or a third-party system 670 to process, transform, manage, retrieve, modify, add, or delete the information stored in the data store.

In particular embodiments, transportation management system 660 may include an authorization server (or any other suitable component(s)) that allows users 601 to opt-in to or opt-out of having their information and actions logged, recorded, or sensed by transportation management system 660 or shared with other systems (e.g., third-party systems 670). In particular embodiments, a user 601 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 601 of transportation management system 660 through blocking, data hashing, anonymization, or other suitable techniques as appropriate.

In particular embodiments, third-party system 670 may be a network-addressable computing system that may provide HD maps or host GPS maps, customer reviews, music or content, weather information, or any other suitable type of information. Third-party system 670 may generate, store, receive, and send relevant data, such as, for example, map data, customer review data from a customer review website, weather data, or any other suitable type of data. Third-party system 670 may be accessed by the other computing entities of the network environment either directly or via network 610. For example, user device 630 may access the third-party system 670 via network 610, or via transportation management system 660. In the latter case, if credentials are required to access the third-party system 670, the user 601 may provide such information to the transportation management system 660, which may serve as a proxy for accessing content from the third-party system 670.

In particular embodiments, user device 630 may be a mobile computing device such as a smartphone, tablet computer, or laptop computer. User device 630 may include one or more processors (e.g., CPU, GPU), memory, and storage. An operating system and applications may be installed on the user device 630, such as, e.g., a transportation application associated with the transportation management system 660, applications associated with third-party systems 670, and applications associated with the operating system. User device 630 may include functionality for determining its location, direction, or orientation, based on integrated sensors such as GPS, compass, gyroscope, or accelerometer. User device 630 may also include wireless transceivers for wireless communication and may support wireless communication protocols such as Bluetooth, near-field communication (NFC), infrared (IR) communication, WI-FI, and 2G/3G/4G/LTE mobile communication standard. User device 630 may also include one or more cameras, scanners, touchscreens, microphones, speakers, and any other suitable input-output devices.

In particular embodiments, the vehicle 640 may be equipped with an array of sensors 644, a navigation system 646, and a ride-service computing device 648. In particular embodiments, a fleet of vehicles 640 may be managed by the transportation management system 660. The fleet of vehicles 640, in whole or in part, may be owned by the entity associated with the transportation management system 660, or they may be owned by a third-party entity relative to the transportation management system 660. In either case, the transportation management system 660 may control the operations of the vehicles 640, including, e.g., dispatching select vehicles 640 to fulfill ride requests, instructing the vehicles 640 to perform select operations (e.g., head to a service center or charging/fueling station, pull over, stop immediately, self-diagnose, lock/unlock compartments, change music station, change temperature, and any other suitable operations), and instructing the vehicles 640 to enter select operation modes (e.g., operate normally, drive at a reduced speed, drive under the command of human operators, and any other suitable operational modes).

In particular embodiments, the vehicles 640 may receive data from and transmit data to the transportation management system 660 and the third-party system 670. Examples of received data may include, e.g., instructions, new software or software updates, maps, 3D models, trained or untrained machine-learning models, location information (e.g., location of the ride requestor, the vehicle 640 itself, other vehicles 640, and target destinations such as service centers), navigation information, traffic information, weather information, entertainment content (e.g., music, video, and news) ride requestor information, ride information, and any other suitable information. Examples of data transmitted from the vehicle 640 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 640, passengers may send/receive data to the transportation management system 660 and third-party system 670), and any other suitable data.

In particular embodiments, vehicles 640 may also communicate with each other, including those managed and not managed by the transportation management system 660. For example, one vehicle 640 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 660 or third-party system 670), or both.

In particular embodiments, a vehicle 640 may obtain and process sensor/telemetry data. Such data may be captured by any suitable sensors. For example, the vehicle 640 may have a Light Detection and Ranging (LiDAR) sensor array of multiple LiDAR transceivers that are configured to rotate 360°, emitting pulsed laser light and measuring the reflected light from objects surrounding vehicle 640. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 640. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 640 may have optical cameras pointing in different directions. The cameras may be used for, e.g., recognizing roads, lane markings, street signs, traffic lights, police, other vehicles, and any other visible objects of interest. To enable the vehicle 640 to "see" at night, infrared cameras may be installed. In particular embodiments, the vehicle may be equipped with stereo vision for, e.g., spotting hazards such as pedestrians or tree branches on the road. As another example, the vehicle 640 may have radars for, e.g., detecting other vehicles and hazards afar. Furthermore, the vehicle 640 may have ultrasound equipment for, e.g., parking and obstacle detection. In addition to sensors enabling the vehicle 640 to detect, measure, and understand the external world around it, the vehicle 640 may further be equipped with sensors for detecting and self-diagnosing the vehicle's own state and condition. For example, the vehicle 640 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 640 may build a 3D model of its surrounding based on data from its LiDAR, radar, sonar, and cameras, along with a pre-generated map obtained from the transportation management system 660 or the third-party system 670. Although sensors 644 appear in a particular location on the vehicle 640 in FIG. 6, sensors 644 may be located in any suitable location in or on the vehicle 640. Example locations for sensors include the front and rear bumpers, the doors, the front windshield, on the side panel, or any other suitable location.

In particular embodiments, the vehicle 640 may be equipped with a processing unit (e.g., one or more CPUs and GPUs), memory, and storage. The vehicle 640 may thus be equipped to perform a variety of computational and processing tasks, including processing the sensor data, extracting useful information, and operating accordingly. For example, based on images captured by its cameras and a machine-vision model, the vehicle 640 may identify particular types of objects captured by the images, such as pedestrians, other vehicles, lanes, curbs, and any other objects of interest.

In particular embodiments, the vehicle 640 may have a navigation system 646 responsible for safely navigating the vehicle 640. In particular embodiments, the navigation system 646 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 646 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 646 may use its determinations to control the vehicle 640 to operate in prescribed manners and to guide the vehicle 640 to its destinations without colliding into other objects. Although the physical embodiment of the navigation system 646 (e.g., the processing unit) appears in a particular location on the vehicle 640 in FIG. 6, navigation system 646 may be located in any suitable location in or on the vehicle 640. Example locations for navigation system 646 include inside the cabin or passenger compartment of the vehicle 640, near the engine/battery, near the front seats, rear seats, or in any other suitable location.

In particular embodiments, the vehicle 640 may be equipped with a ride-service computing device 648, which may be a tablet or any other suitable device installed by transportation management system 660 to allow the user to interact with the vehicle 640, transportation management system 660, other users 601, or third-party systems 670. In particular embodiments, installation of ride-service computing device 648 may be accomplished by placing the ride-service computing device 648 inside the vehicle 640, and configuring it to communicate with the vehicle 640 via a wired or wireless connection (e.g., via Bluetooth). Although FIG. 6 illustrates a single ride-service computing device 648 at a particular location in the vehicle 640, the vehicle 640 may include several ride-service computing devices 648 in several different locations within the vehicle. As an example and not by way of limitation, the vehicle 640 may include four ride-service computing devices 648 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 648 may be detachable from any component of the vehicle 640. This may allow users to handle ride-service computing device 648 in a manner consistent with other tablet computing devices. As an example and not by way of limitation, a user may move ride-service computing device 648 to any location in the cabin or passenger compartment of the vehicle 640, may hold ride-service computing device 648, or handle ride-service computing device 648 in any other suitable manner. Although this disclosure describes providing a particular computing device in a particular manner, this disclosure contemplates providing any suitable computing device in any suitable manner.

Figure 7:
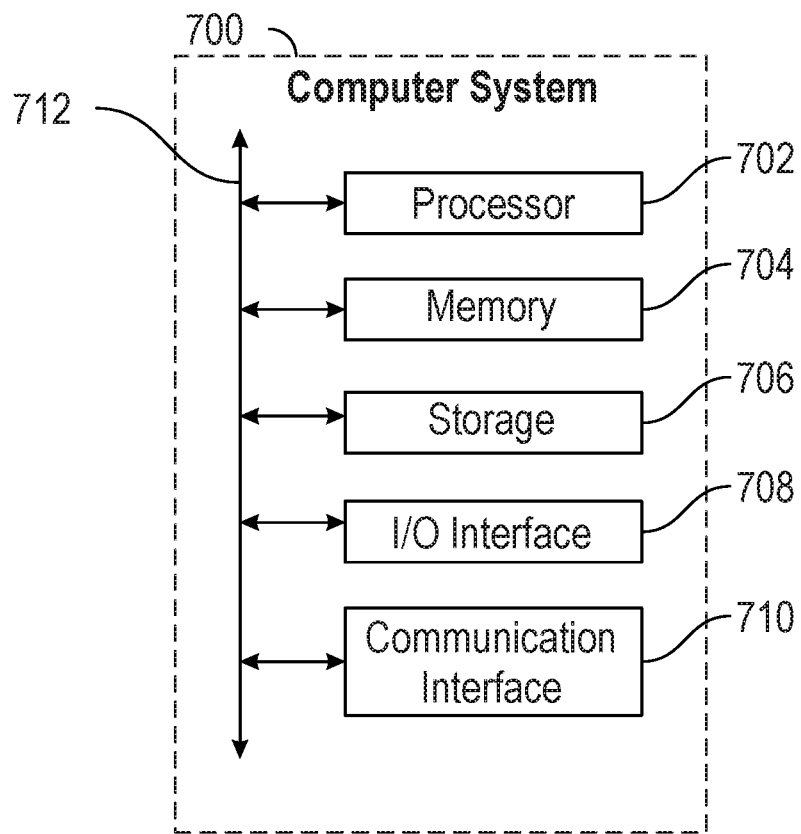
FIG. 7 illustrates an example of a computer system or computing device that can be utilized in various scenarios, according to an embodiment of the present technology.

FIG. 7 illustrates an example computer system 700. In particular embodiments, one or more computer systems 700 perform one or more steps of one or more methods described or illustrated herein. In particular embodiments, one or more computer systems 700 provide the functionalities described or illustrated herein. In particular embodiments, software running on one or more computer systems 700 performs one or more steps of one or more methods described or illustrated herein or provides the functionalities described or illustrated herein. Particular embodiments include one or more portions of one or more computer systems 700. Herein, a reference to a computer system may encompass a computing device, and vice versa, where appropriate. Moreover, a reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 that are to be operated on by computer instructions; the results of previous instructions executed by processor 702 that are accessible to subsequent instructions or for writing to memory 704 or storage 706; or any other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs), be a multi-core processor, or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical isc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware or software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware or software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware or software, or both coupling components of computer system 700 to each other. As an example and not by way of limitation, bus 712 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method comprising:
receiving, by a computing system, a message transmitted over a robotics framework implemented on a vehicle;
determining, by the computing system, that the message satisfies criteria for multi-threaded hashing;
determining a number of threads to be utilized for multi-threaded hashing of the message according to at least a message size of the message and by maximizing the number of threads while satisfying a minimum message segment size threshold;
dividing, by the computing system, the message into two or more message segments;
independently computing, by the computing system, a hash for each message segment of the two or more message segments to generate two or more message segment hashes; and
determining, by the computing system, a message hash for the message based on the two or more message segment hashes.

2. The computer-implemented method of claim 1, wherein the criteria for multi-threaded hashing comprises a message size threshold.

3. The computer-implemented method of claim 1, wherein the number of threads to be utilized is determined based on how many CPU cores are available for multi-threaded hashing of the message.

4. The computer-implemented method of claim 3, wherein the number of threads to be utilized is determined further based on a message size of the message and a minimum message segment size threshold.

5. The computer-implemented method of claim 3, wherein a number of message segments in the two or more message segments is equal to the number of threads.

6. The computer-implemented method of claim 1, wherein each message segment of the two or more message segments is assigned to a respective CPU core of a plurality of CPU cores and hashes are computed for the two or more message segments in parallel.

7. The computer-implemented method of claim 1, wherein each message segment hash is computed using a rolling hash algorithm.

8. The computer-implemented method of claim 7, wherein each message segment hash is computed using a polynomial hash algorithm.

9. A system comprising:
at least one processor; and
a memory storing instructions that, when executed by the at least one processor, cause the system to perform:
receiving a message transmitted over a robotics framework implemented on a vehicle;
determining that the message satisfies criteria for multi-threaded hashing;
determining a number of threads to be utilized for multi-threaded hashing of the message according to at least a message size of the message and by maximizing the number of threads while satisfying a minimum message segment size threshold;
dividing the message into two or more message segments;
independently computing a hash for each message segment of the two or more message segments to generate two or more message segment hashes; and
determining a message hash for the message based on the two or more message segment hashes.

10. The system of claim 9, wherein the criteria for multi-threaded hashing comprises a message size threshold.

11. The system of claim 10, wherein the number of threads to be utilized is determined based on how many CPU cores are available for multi-threaded hashing of the message.

12. The system of claim 11, wherein the number of threads to be utilized is determined further based on a minimum message segment size threshold.

13. A non-transitory computer-readable storage medium including instructions that, when executed by at least one processor of a computing system, cause the computing system to perform a method comprising:
receiving a message transmitted over a robotics framework implemented on a vehicle;
determining that the message satisfies criteria for multi-threaded hashing;
determining a number of threads to be utilized for multi-threaded hashing of the message according to at least a message size of the message and by maximizing the number of threads while satisfying a minimum message segment size threshold;
dividing the message into two or more message segments;
independently computing a hash for each message segment of the two or more message segments to generate two or more message segment hashes; and
determining a message hash for the message based on the two or more message segment hashes.

14. The non-transitory computer-readable storage medium of claim 13, wherein the criteria for multi-threaded hashing comprises a message size threshold.

15. The non-transitory computer-readable storage medium of claim 6, wherein the number of threads to be utilized is determined based on how many CPU cores are available for multi-threaded hashing of the message.

16. The non-transitory computer-readable storage medium of claim 15, wherein the number of threads to be utilized is determined further based on a minimum message segment size threshold.

* * * * *